United States Patent
Choi

(10) Patent No.: US 8,489,105 B2
(45) Date of Patent: Jul. 16, 2013

(54) RADIO BASE STATIONS, RADIO COMMUNICATION DEVICES, METHODS FOR CONTROLLING A RADIO BASE STATION AND METHODS FOR CONTROLLING A RADIO COMMUNICATION DEVICE

(75) Inventor: Hyung-Nam Choi, Hamburg (DE)

(73) Assignee: Intel Mobile Communications GmbH, Neubiberg (DE)

(*) Notice: Subject to any disclaimer, the term of this patent is extended or adjusted under 35 U.S.C. 154(b) by 262 days.

(21) Appl. No.: 12/612,690

(22) Filed: Nov. 5, 2009

(65) Prior Publication Data

US 2011/0105136 A1  May 5, 2011

(51) Int. Cl.
*H04W 72/00* (2009.01)
*H04W 4/00* (2009.01)
*H04B 7/00* (2006.01)
*H04J 3/00* (2006.01)

(52) U.S. Cl.
USPC ........ 455/452.1; 455/450; 455/509; 370/329; 370/345

(58) Field of Classification Search
USPC ................. 455/45, 450, 452.2, 509; 370/329, 370/345
See application file for complete search history.

(56) References Cited

U.S. PATENT DOCUMENTS

| | | | |
|---|---|---|---|
| 8,194,603 B2 * | 6/2012 | Nimbalker et al. | 370/329 |
| 2006/0280142 A1 | 12/2006 | Damnjanovic et al. | |
| 2008/0117891 A1 * | 5/2008 | Damnjanovic et al. | 370/345 |
| 2008/0225783 A1 * | 9/2008 | Wang et al. | 370/329 |
| 2009/0103500 A1 | 4/2009 | Malkamaki et al. | |
| 2010/0040004 A1 * | 2/2010 | Damnjanovic et al. | 370/329 |
| 2010/0111023 A1 * | 5/2010 | Pelletier et al. | 370/329 |
| 2010/0220652 A1 * | 9/2010 | Ishii et al. | 370/328 |
| 2010/0227569 A1 * | 9/2010 | Bala et al. | 455/73 |
| 2011/0044259 A1 * | 2/2011 | Nimbalker et al. | 370/329 |
| 2011/0044261 A1 * | 2/2011 | Cai et al. | 370/329 |

FOREIGN PATENT DOCUMENTS

| | | |
|---|---|---|
| CN | 101478824 A | 7/2009 |
| CN | 101488832 A | 7/2009 |
| CN | 101507201 A | 8/2009 |
| WO | 2008115134 A2 | 9/2008 |
| WO | 2009115904 A2 | 9/2009 |
| WO | 2009132203 A1 | 10/2009 |

OTHER PUBLICATIONS

3GPP TS 36.211, V8.8.0 (Sep. 2009): "3rd Generation Partnership Project; Technical Specification Group Radio Access Network; Evolved Universal Terrestrial Radio Access (E-UTRA)—Physical channels and modulation, (Release 8)", pp. 1-83.

(Continued)

*Primary Examiner* — Wesley Kim

(57) ABSTRACT

In an embodiment, a radio base station is provided. The radio base station may include a transceiver configured to transmit data to a radio communication device and receive data from the radio communication device using a plurality of component carriers, each component carrier including a pre defined frequency band including a plurality of resource elements; a component carrier determiner configured to determine a subset comprising at least one component carrier of the plurality of component carriers, wherein as the at least one component carrier of the subset may be used by the radio communication device for a pre-defined communication mode; and a message generator configured to generate a message including information specifying that the at least one component carrier of the subset may be used by the radio communication device for the pre-defined communication mode.

21 Claims, 8 Drawing Sheets

OTHER PUBLICATIONS

RP-080137: "Further advancements for E-UTRA (LTE-Advanced)" Puerto Vallarta, Mexico, Mar. 4-7, 2008, source: NTT DoCoMo et al., pp. 1-5.

3GPP TS 36.913, V8.0.1 (Mar. 2009): "3rd Generation Partnership Project; Technical Specification Group Radio Access Network; Requirements for further advancements for Evolved Universal Terrestrial Radio Access" (E-UTRA) (LTE-Advanced) (Release 8), pp. 1-15.

3GPP TR 36.814, V0.4.1 (Feb. 2009): "3rd Generation Partnership Project; Technical Specification Group Radio Access Network; Further advancements for E-UTRA—Physical Layer Aspects, (Release 9)", pp. 1-31.

3GPP TS 36.213, V8.8.0, (Sep. 2009): "3rd Generation Partnership Project; Technical Specification Group Radio Access Network; Evolved Universal Terrestrial Radio Access (E-UTRA)—Physical layer procedures, (Release 8)", pp. 1-77.

3GPP TR 36.300, V9.1.0 (Sep. 2009): "3rd Generation Partnership Project; Technical Specification Group Radio Access Network; Evolved Universal Terrestrial Radio Access (E-UTRA) and Evolved Universal Terrestrial Radio Access Network (E-UTRAN)—Overall description, Stage 2 (Release 9)", pp. 1-165.

3GPP TS 36.321, V9.0.0 (Sep. 2009): "3rd Generation Partnership Project; Technical Specification Group Radio Access Network; Evolved Universal Terrestrial Radio Access (E-UTRA) Medium Access Control (MAC) protocol specification, (Release 9)", pp. 1-47.

3GPP TS 36.331, V9.0.0 (Sep. 2009): 3rd Generation Partnership Project; Technical Specification Group Radio Access Network; Evolved Universal Terrestrial Radio Access (E-UTRA) Radio Resource Control (RRC) protocol specification, (Release 9), pp. 1-213.

R2-094546: "Semi-Persistent Scheduling with Carrier Aggregation", Shenzhen, P.R. China, Aug. 24-28, 2009, Soure: Motorola, pp. 1-2.

R2-092357: "MAC-layer impacts of bandwidth aggregation" Seoul, Korea, Mar. 23-27, Source: Motorola, pp. 1-4.

English abstract for CN101507201A dated Apr. 18, 2013.
English abstract for CN101478824A dated Apr. 18, 2013.
English abstract for CN101488832A dated Apr. 18, 2013.

* cited by examiner

FIG 3

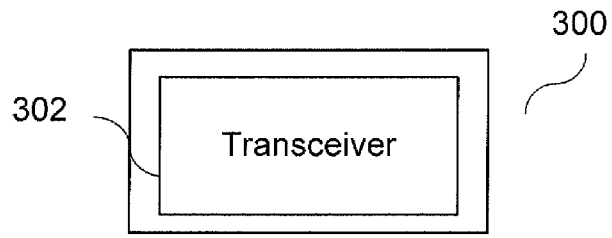

FIG 4

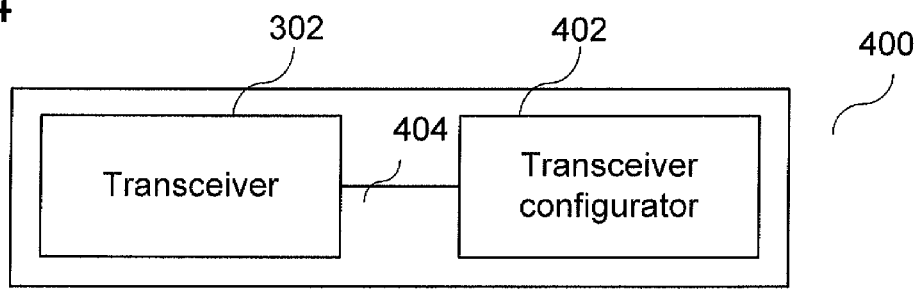

FIG 5

502
Transmit data to a radio communication device and receive data from the radio communication device using a plurality of component carriers, each component carrier including a pre-defined frequency band comprising a plurality of resource elements 504
Determine a subset comprising at least one component carrier of the plurality of component carriers, wherein the at least one component carrier of the subset may be used by the radio communication device for a pre-defined communication mode 506
Generate a message comprising information specifying that the at least one component carrier of the subset may be used by the radio communication device for the pre-defined communication mode

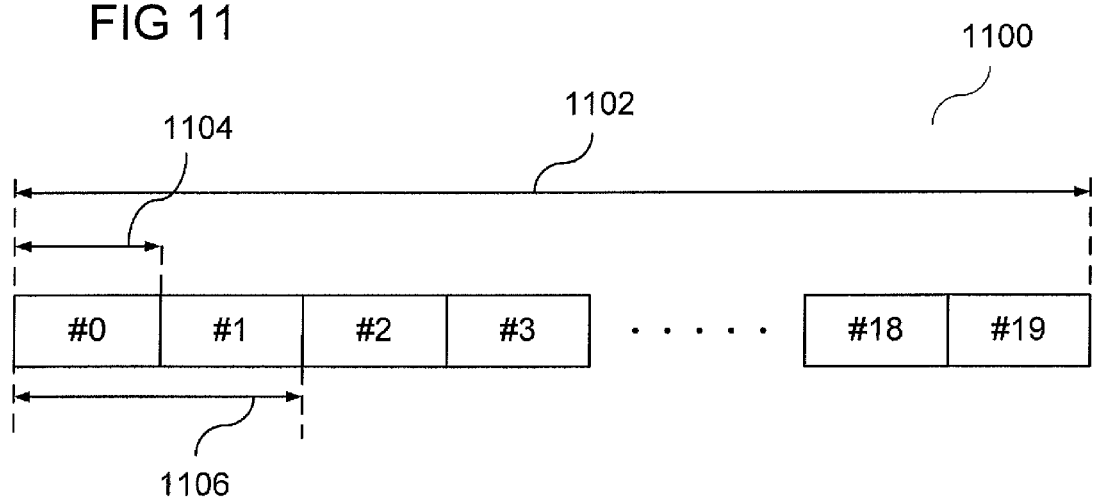
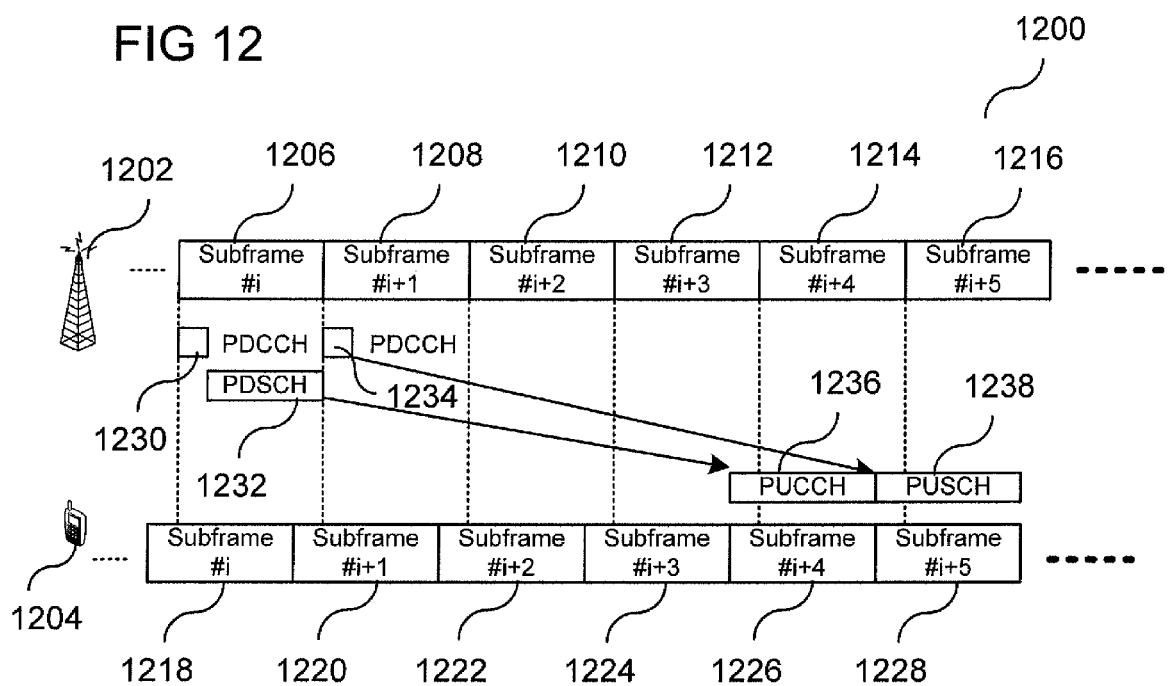

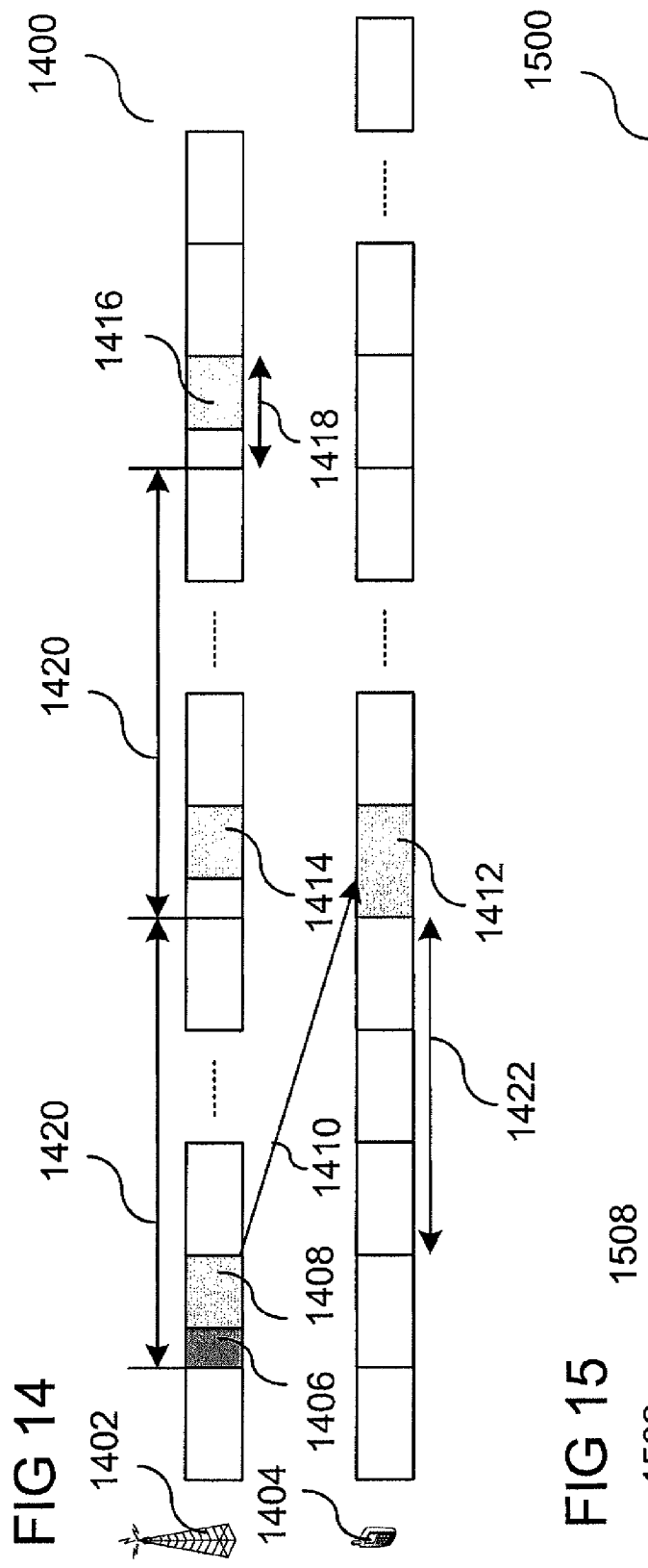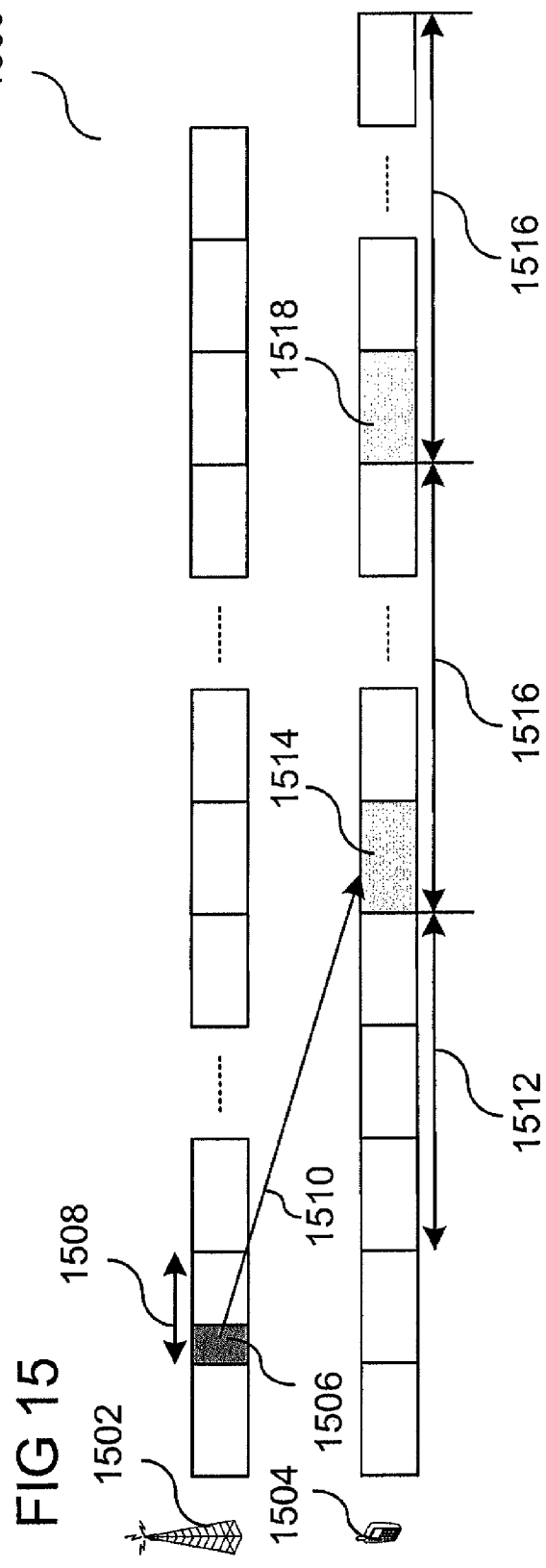

RADIO BASE STATIONS, RADIO COMMUNICATION DEVICES, METHODS FOR CONTROLLING A RADIO BASE STATION AND METHODS FOR CONTROLLING A RADIO COMMUNICATION DEVICE

TECHNICAL FIELD

Various embodiments relate generally to radio base stations, radio communication devices, methods for controlling a radio base station and methods for controlling a radio communication device.

BACKGROUND

Commonly, two types of scheduling mechanisms may be supported in mobile communication systems. When applying dynamic scheduling in uplink and/or in downlink, a base station may dynamically allocate resources to radio communication devices at each transmission time interval (TTI). In addition, semi-persistent scheduling (SPS) may be applied in uplink or in downlink if enabled by the radio base station for reducing signaling overhead for periodic type of traffic with predictable packet arrival times and fixed (small or medium) payload size such as voice over IP (VoIP). In case of SPS, the radio base station may allocate SPS resources for the first hybrid automatic repeat request (HARQ) transmissions to radio communication device. SPS allocations may be identified on a control channel. The SPS resources may be implicitly reused in the following TTIs according to a periodicity defined by the radio base station.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a radio communication device in accordance with an embodiment;

FIG. 4 shows a radio communication device in accordance with an embodiment;

FIG. 5 shows a flow diagram illustrating a method for controlling a radio base station in accordance with an embodiment;

FIG. 11 shows a frame structure in accordance with an embodiment;

FIG. 12 shows a diagram illustrating an uplink/downlink transmission timing for frequency division duplex in accordance with an embodiment;

FIG. 14 shows a flow diagram illustrating initial semi-persistent scheduling activation in downlink in accordance with an embodiment;

FIG. 15 shows a flow diagram illustrating initial semi-persistent scheduling activation in uplink in accordance with an embodiment.

DESCRIPTION

Figure 1:
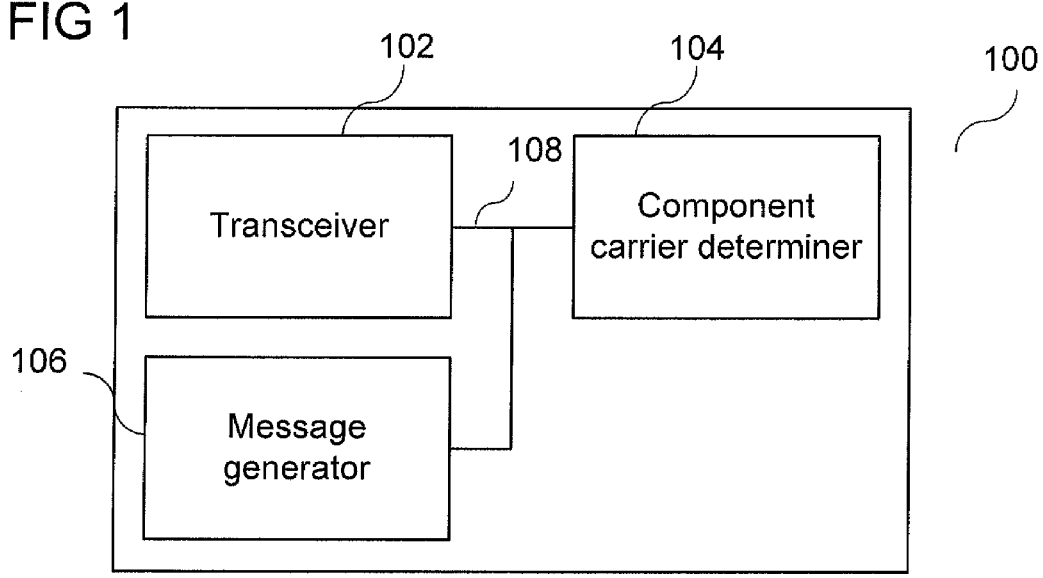
FIG. 1 shows a radio base station in accordance with an embodiment.

In various embodiments, a radio base station and a radio communication device may communicate using a plurality of component carriers, as will be explained in more detail below. In various embodiments, semi-persistent scheduling, as will be explained in more detail below, may be applied to only a pre-defined subset of all component carriers available. In various embodiments, the radio base station may provide a radio communication device with information specifying on which of the component carriers transmission and reception according to semi-persistent scheduling may be allowed for the radio communication device.

The following detailed description refers to the accompanying drawings that show, by way of illustration, specific details and embodiments in which the invention may be practiced. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description therefore, is not to be taken in a limiting sense, and the scope of the present invention is defined by the appended claims.

The word "exemplary" is used herein to mean "serving as an example, instance, or illustration". Any embodiment or design described herein as "exemplary" is not necessarily to be construed as preferred or advantageous over other embodiments or designs.

A radio communication device according to various embodiments may be a device configured for wireless communication. In various embodiments, a radio communication device may be an end-user mobile device (MD). In various embodiments, a radio communication device may be any kind of mobile telephone, personal digital assistant, mobile computer, or any other mobile device configured for communication with a mobile communication base station or an access point and may be also referred to as a User Equipment (UE), a mobile station (MS) or an advanced mobile station (advanced MS, AMS), for example in accordance with IEEE 802.16m may be incorporated.

A radio communication device according to various embodiments may include a memory which is for example used in the processing carried out by the end-user mobile devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

A radio base station according to various embodiments may include a memory which is for example used in the processing carried out by the end-user mobile devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAIVI (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The terms "coupling" or "connection" are intended to include a direct "coupling" or direct "connection" as well as an indirect "coupling" or indirect "connection", respectively.

The term "protocol" is intended to include any piece of software that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

In various embodiments, a subset of a set may consist of at least one but not all elements of the set. In other words, in various embodiments, a subset may be understood as a non-empty proper subset.

Various embodiments are provided for devices, and various embodiments are provided for methods. It will be understood that basic properties of the devices also hold for the methods and vice versa. Therefore, for sake of brevity, duplicate description of such properties may be omitted.

In various embodiments, a (radio) resource of one or more (radio) resources will be understood as for example transmission frequency, transmission modulation scheme, transmission code, and/or transmission time slot, or any other feature of a transmitted signal.

FIG. 1 shows a radio base station 100 in accordance with an embodiment. The radio base station 100 may include a transceiver 102 configured to transmit data to a radio communication device and receive data from the radio communication device using a plurality of component carriers, each component carrier including or consisting of a pre-defined frequency band including a plurality of resource elements; a component carrier determiner 104 configured to determine a subset including at least one component carrier of the plurality of component carriers, wherein the at least one component carrier of the subset may be used by the radio communication device for a pre-defined communication mode; and a message generator 106 configured to generate a message including information specifying that the at least one component carrier of the subset may be used by the radio communication device for the pre-defined communication mode. In another embodiment, the radio base station may include a transceiver configured to transmit and receive data to and from a radio communication device using a plurality of component carriers, each component carrier including or consisting of a pre-defined frequency band including a plurality of resource elements; a selected component carrier determiner configured to determine at least one selected component carrier of the plurality of component carriers selected as component carriers which may be used by the radio communication device for a pre-defined communication mode; and a message generator configured to generate a message including information specifying that the at least one selected component carrier may be used by the radio communication device for the pre-defined communication mode. The transceiver 102, the component carrier determiner 104 (resp. the selected component carrier determiner) and the message generator 106 may be coupled with each other, e.g. via an electrical connection 108 such as e.g. a cable or a computer bus or via any other suitable electrical connection to exchange electrical signals.

In various embodiments, the transceiver 102 may be further configured according to Third Generation Partnership Project Long Term Evolution Advanced (3GPP LTE Advanced).

In various embodiments, the transceiver 102 may be further configured according to Worldwide Interoperability for Microwave Access (WiMax).

In various embodiments, the transceiver 102 may be further configured according to an IEEE 802.16 radio communication standard.

In various embodiments, the transceiver 102 may be further configured according to WiMax fixed.

In various embodiments, the transceiver 102 may be further configured according to WiMax mobile.

In various embodiments, the transceiver 102 may be further configured according to an OFDMA (Orthogonal Frequency Division Multiple Access)/TDMA (Time Division Multiple Access) transmission and reception scheme.

In various embodiments, the transceiver 102 may be further configured according to a SC-FDMA (Single Carrier Frequency Division Multiple Access)/TDMA (Time Division Multiple Access) transmission and reception scheme.

In various embodiments, the transceiver 102 may be further configured according to a multi-carrier transmission scheme.

In various embodiments, the plurality of component carriers may be contiguous.

In various embodiments, the plurality of component carriers may be non-contiguous.

In various embodiments, at least one of the plurality of component carriers may consist of a frequency band with a bandwidth equal to or less than 50 MHz, e.g. of a frequency band with a bandwidth equal to or less than 40 MHz, e.g. of a frequency band with a bandwidth equal to or less than 20 MHz.

In various embodiments, the sum of bandwidths of the bands of the plurality of component carriers may be equal to or less than 500 MHz, e.g. equal to or less than 200 MHz, e.g. equal to or less than 100 MHz.

In various embodiments, the sum of bandwidths of the bands of the plurality of component carriers may be equal to or less than 100 MHz, e.g. equal to or less than 60 MHz, e.g. equal to or less than 40 MHz.

In various embodiments, the resource elements may be resource blocks.

In various embodiments, the component carrier determiner 104 may be configured to receive information from the core network specifying that the at least one component carrier of the subset may be used by the radio communication device for the pre-defined communication mode from the core network. In various embodiments, the selected component carrier determiner may be configured to receive information from the core network specifying that the at least one selected component carrier may be used by the radio communication device for the pre-defined communication mode.

In various embodiments, the pre-defined communication mode may include or may be a communication mode where assignment of resources may go beyond a pre-defined transmission time interval.

In various embodiments, the pre-defined communication mode may include or may be a communication mode of persistently scheduled transmission or reception.

In various embodiments, the pre-defined communication mode may include or may be a communication mode of semi-persistently scheduled transmission or reception.

In various embodiments, the at least one component carrier of the subset may include or may be a component carrier in uplink or downlink to be used by the radio communication device for semi-persistent scheduling. In other words: In various embodiments, the component carrier which may be used by the radio communication device may include or may be a component carrier in uplink or downlink to be used by the radio communication device for semi-persistent scheduling.

In various embodiments, the at least one component carrier of the subset may include or may be an anchor carrier to be used by the radio communication device. In other words: In various embodiments, the component carrier which may be used by the radio communication device may include or may be an anchor carrier to be used by the radio communication device.

In various embodiments, the message may further include information specifying a bandwidth range for dynamic scheduling used to indicate the bandwidth range in uplink or downlink to be used by the radio base station 100 for dynamic scheduling based on the anchor carrier.

In various embodiments, the information specifying the bandwidth range for dynamic scheduling may include at least one of the following information: "symmetrical" for specifying that component carriers located symmetrical around the anchor carrier may be used for dynamic scheduling; "upper" for specifying that component carriers located above the anchor carrier and including the anchor carrier may be used for dynamic scheduling; and "lower" for specifying that component carriers located below the anchor carrier and including the anchor carrier may be used for dynamic scheduling.

Figure 2:
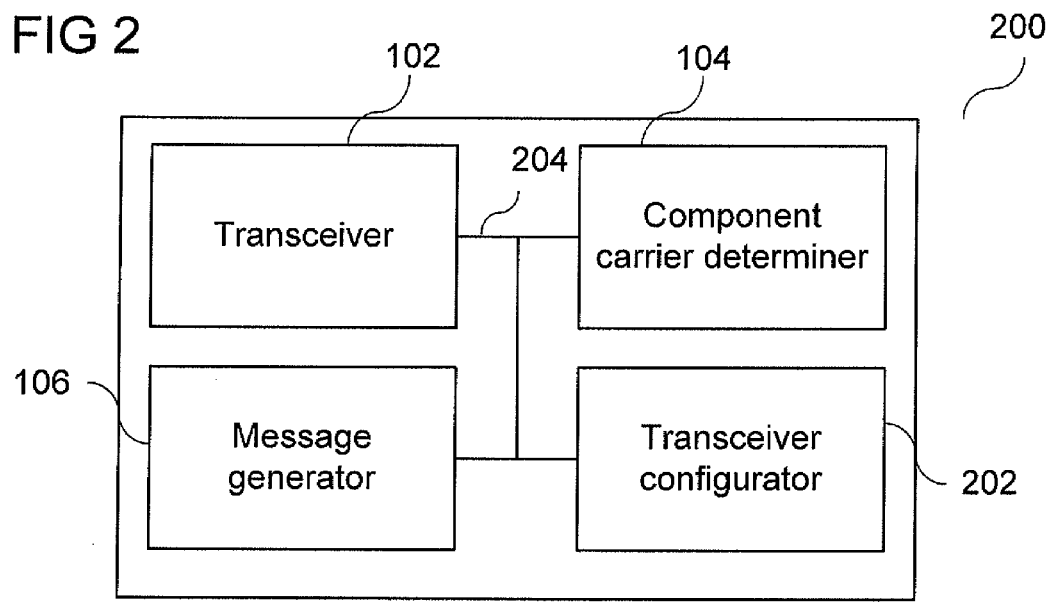
FIG. 2 shows a radio base station in accordance with an embodiment.

FIG. 2 shows a radio base station 200 in accordance with an embodiment. The radio base station 200 similar to the radio base station 100 of FIG. 1 may include a transceiver 102 configured to transmit data to a radio communication device and receive data from the radio communication device using a plurality of component carriers, each component carrier including a pre-defined frequency band including a plurality of resource elements; a component carrier determiner 104 configured to determine a subset including at least one component carrier of the plurality of component carriers, wherein the at least one component carrier of the subset may be used by the radio communication device for a pre-defined communication mode; and a message generator 106 configured to generate a message including information specifying that the at least one component carrier of the subset may be used by the radio communication device for the pre-defined communication mode. In another embodiment, the radio base station may include a transceiver configured to transmit and receive data to and from a radio communication device using a plurality of component carriers, each component carrier including a pre-defined frequency band including a plurality of resource elements; a selected component carrier determiner configured to determine at least one selected component carrier of the plurality of component carriers selected as component carriers which may be used by the radio communication device for a pre-defined communication mode; and a message generator configured to generate a message including information specifying that the at least one selected component carrier may be used by the radio communication device for the pre-defined communication mode. The radio base station 200 may further include a transceiver configurator 202 configured to configure the transceiver 102 according to the at least one component carrier of the subset. In other words: The radio base station 200 may further include a transceiver configurator 202 configured to configure the transceiver 102 according to the determined at least one selected component carrier. The transceiver 102, the component carrier determiner 104 (resp. the selected component carrier determiner), the message generator 106 and the transceiver configurator 202 may be coupled with each other, e.g. via an electrical connection 204 such as e.g. a cable or a computer bus or via any other suitable electrical connection to exchange electrical signals.

In various embodiments, the transceiver configurator 202 may further be configured to configure the transceiver 102 to use the at least one component carrier of the subset for the pre-defined communication mode. In other words: In various embodiments, the transceiver configurator 202 may further be configured to configure the transceiver 102 to use the determined at least one selected component carrier for the pre-defined communication mode.

In various embodiments, the transceiver 102 may further be configured to transmit the generated message.

In various embodiments, the transceiver 102 may further be configured to transmit the generated message using a component carrier that has been previously determined as component carrier which may be used by the radio communication device for the pre-defined communication mode. In other words: In various embodiments, the transceiver 102 may further be configured to transmit the generated message using a component carrier that has been previously selected as component carrier which may be used by the radio communication device for the pre-defined communication mode.

In various embodiments, the transceiver may further be configured to transmit the generated message using a physical downlink control channel.

FIG. 3 shows a radio communication device 300 in accordance with an embodiment. The radio communication device 300 may include a transceiver 302 configured to transmit data to a radio base station (not shown) and receive data from the radio base station using a plurality of component carriers, each component carrier including a pre-defined frequency band including a plurality of resource elements. In other words: The radio communication device 300 may include a transceiver 302 configured to transmit and receive data to and from a radio base station (not shown) using a plurality of component carriers, each component carrier including a pre-defined frequency band including a plurality of resource elements. The transceiver 302 may further be configured to receive a message including information specifying at least one component carrier which may be used by the radio communication device 300 for a pre-defined communication mode.

In various embodiments, the transceiver 302 may be further configured according to Third Generation Partnership Project Long Term Evolution Advanced (3GPP LTE Advanced).

In various embodiments, the transceiver 302 may be further configured according to Worldwide Interoperability for Microwave Access (WiMax).

In various embodiments, the transceiver 302 may be further configured according to an IEEE 802.16 radio communication standard.

In various embodiments, the transceiver 302 may be further configured according to WiMax fixed.

In various embodiments, the transceiver 302 may be further configured according to WiMax mobile.

In various embodiments, the transceiver 302 may be further configured according to an OFDMA (Orthogonal Frequency Division Multiple Access)/TDMA (Time Division Multiple Access) transmission and reception scheme.

In various embodiments, the transceiver 302 may be further configured according to a SC-FDMA (Single Carrier Frequency Division Multiple Access)/TDMA (Time Division Multiple Access) transmission and reception scheme.

In various embodiments, the transceiver 302 may be further configured according to a multi-carrier transmission scheme.

In various embodiments, the plurality of component carriers may be contiguous.

In various embodiments, the plurality of component carriers may be non-contiguous.

In various embodiments, at least one of the plurality of component carriers may consist of a frequency band with a bandwidth equal to or less than 50 MHz, e.g. of a frequency band with a bandwidth equal to or less than 40 MHz, e.g. of a frequency band with a bandwidth equal to or less than 20 MHz.

In various embodiments, the sum of bandwidths of the bands of the plurality of component carriers may be equal to or less than 500 MHz, e.g. equal to or less than 200 MHz, e.g. equal to or less than 100 MHz.

In various embodiments, the sum of bandwidths of the bands of the plurality of component carriers may be equal to or less than 100 MHz, e.g. equal to or less than 60 MHz, e.g. equal to or less than 40 MHz.

In various embodiments, the resource elements may be resource blocks.

In various embodiments, the pre-defined communication mode may include or may be a communication mode where assignment of resources may go beyond a pre-defined transmission time interval.

In various embodiments, the pre-defined communication mode may include or may be a communication mode of persistently scheduled transmission or reception.

In various embodiments, the pre-defined communication mode may include or may be a communication mode of semi-persistently scheduled transmission or reception.

In various embodiments, the at least one component carrier of the subset may include or may be a component carrier in uplink or downlink to be used by the radio communication device 300 for semi-persistent scheduling. In other words: In various embodiments, the component carrier which may be used by the radio communication device 300 may include or may be a component carrier in uplink or downlink to be used by the radio communication device 300 for semi-persistent scheduling.

In various embodiments, the at least one component carrier of the subset may include or may be an anchor carrier to be used by the radio communication device 300.

In various embodiments, the message may further include information specifying a bandwidth range for dynamic scheduling used to indicate the bandwidth range in uplink or downlink to be used by the radio base station for dynamic scheduling based on the anchor carrier.

In various embodiments, the information specifying the bandwidth range for dynamic scheduling may include at least one of the following information: "symmetrical" for specifying that component carriers located symmetrical around the anchor carrier may be used for dynamic scheduling; "upper" for specifying that component carriers located above the anchor carrier and including the anchor carrier may be used for dynamic scheduling; and "lower" for specifying that component carriers located below the anchor carrier and including the anchor carrier may be used for dynamic scheduling.

FIG. 4 shows a radio communication device 400 in accordance with an embodiment. The radio communication device 400, similar to the radio communication device 300 of FIG. 3, may include a transceiver 302 configured to transmit data to a radio base station (not shown) and receive data from the radio base station using a plurality of component carriers, each component carrier including a pre-defined frequency band including a plurality of resource elements. In other words: The radio communication device 400, similar to the radio communication device 300 of FIG. 3, may include a transceiver 302 configured to transmit and receive data to and from a radio base station (not shown) using a plurality of component carriers, each component carrier including a pre-defined frequency band including a plurality of resource elements. The transceiver 302 may further be configured to receive a message including information specifying at least one component carrier which may be used by the radio communication device 400 for a pre-defined communication mode. The radio communication device 400 may further include a transceiver configurator 402 configured to configure the transceiver 302 according to the at least one component carrier of the subset. In other words: The radio communication device 400 may further include a transceiver configurator 402 configured to configure the transceiver 302 according to the determined at least one selected component carrier. The transceiver 302 and the transceiver configurator 402 may be coupled with each other, e.g. via an electrical connection 404 such as e.g. a cable or a computer bus or via any other suitable electrical connection to exchange electrical signals.

In various embodiments, the transceiver configurator 402 may further be configured to configure the transceiver 302 to use the at least one component carrier of the subset for the pre-defined communication mode. In other words: In various embodiments, the transceiver configurator 402 may further be configured to configure the transceiver 302 to use the determined at least one selected component carrier for the pre-defined communication mode.

In various embodiments, the transceiver 302 may further be configured to receive the message using a component carrier that has been specified as component carrier which may be used by the radio communication device 400 for the pre-defined communication mode in a previously received message.

In various embodiments, the transceiver 302 may further be configured to receive the message using a physical downlink control channel.

FIG. 5 shows a flow diagram 500 illustrating a method for controlling a radio base station in accordance with an embodiment. In 502, data may be transmitted to a radio communication device and received from the radio communication device using a plurality of component carriers, each component carrier including a pre-defined frequency band including a plurality of resource elements. In other words: In 502, data may be transmitted and received to and from a radio communication device using a plurality of component carriers, each component carrier including a pre-defined frequency band including a plurality of resource elements. In 504, a subset including at least one component carrier of the plurality of component carriers, wherein the at least one component carrier of the subset may be used by the radio communication device for a pre-defined communication mode may be determined. In other words: In 504, at least one selected component carrier of the plurality of component carriers selected as component carriers which may be used by the radio communication device for a pre-defined communication mode may be determined. In 506, a message including information specifying that the at least one component carrier of the subset may be used by the radio communication device for the pre-defined communication mode may be generated. In other words: In 506, a message including information specifying that the at least one selected component carrier may be used by the radio communication device for the pre-defined communication mode may be generated.

In various embodiments, data may be transmitted and received according to Third Generation Partnership Project Long Term Evolution Advanced (3GPP LTE Advanced).

In various embodiments, data may be transmitted and received according to Worldwide Interoperability for Microwave Access (WiMax).

In various embodiments, data may be transmitted and received according to an IEEE 802.16 radio communication standard.

In various embodiments, data may be transmitted and received according to WiMax fixed.

In various embodiments, data may be transmitted and received according to WiMax mobile.

In various embodiments, data may be transmitted and received according to an OFDMA (Orthogonal Frequency Division Multiple Access)/TDMA (Time Division Multiple Access) transmission and reception scheme.

In various embodiments, data may be transmitted and received according to a SC-FDMA (Single Carrier Frequency Division Multiple Access)/TDMA (Time Division Multiple Access) transmission and reception scheme.

In various embodiments, data may be transmitted and received according to a multi-carrier transmission scheme.

In various embodiments, the plurality of component carriers may be contiguous.

In various embodiments, the plurality of component carriers may be non-contiguous.

In various embodiments, at least one of the plurality of component carriers may consist of a frequency band with a bandwidth equal to or less than 50 MHz, e.g. of a frequency band with a bandwidth equal to or less than 40 MHz, e.g. of a frequency band with a bandwidth equal to or less than 20 MHz.

In various embodiments, the sum of bandwidths of the bands of the plurality of component carriers may be equal to or less than 500 MHz, e.g. equal to or less than 200 MHz, e.g. equal to or less than 100 MHz.

In various embodiments, the sum of bandwidths of the bands of the plurality of component carriers may be equal to or less than 100 MHz, e.g. equal to or less than 60 MHz, e.g. equal to or less than 40 MHz.

In various embodiments, the resource elements may be resource blocks.

In various embodiments, the information specifying that the at least one component carrier of the subset may be used by the radio communication device for the pre-defined communication mode may be received from the core network. In other words: In various embodiments, the information specifying that the at least one selected component carrier may be used by the radio communication device for the pre-defined communication mode may be received from the core network.

In various embodiments, the pre-defined communication mode may include or may be a communication mode where assignment of resources may go beyond a pre-defined transmission time interval.

In various embodiments, the pre-defined communication mode may include or may be a communication mode of persistently scheduled transmission or reception.

In various embodiments, the pre-defined communication mode may include or may be a communication mode of semi-persistently scheduled transmission or reception.

In various embodiments, the at least one component carrier of the subset may include or may be a component carrier in uplink or downlink to be used by the radio communication device for semi-persistent scheduling. In other words: In various embodiments, the component carrier which may be used by the radio communication device may include or may be a component carrier in uplink or downlink to be used by the radio communication device for semi-persistent scheduling.

In various embodiments, the at least one component carrier of the subset may include or may be an anchor carrier to be used by the radio communication device. In other words: In various embodiments, the component carrier which may be used by the radio communication device may include or may be an anchor carrier to be used by the radio communication device.

In various embodiments, the message may further include information specifying a bandwidth range for dynamic scheduling used to indicate the bandwidth range in uplink or downlink to be used by the radio base station for dynamic scheduling based on the anchor carrier.

In various embodiments, the information specifying the bandwidth range for dynamic scheduling may include at least one of the following information: "symmetrical" for specifying that component carriers located symmetrical around the anchor carrier may be used for dynamic scheduling; "upper" for specifying that component carriers located above the anchor carrier and including the anchor carrier may be used for dynamic scheduling; and "lower" for specifying that component carriers located below the anchor carrier and including the anchor carrier may be used for dynamic scheduling.

In various embodiments, the transceiver may be configured according to the at least one component carrier of the subset. In other words: In various embodiments, the transceiver may be configured according to the determined at least one selected component carrier.

In various embodiments, the transceiver may be configured to use the at least one component carrier of the subset for the pre-defined communication mode. In other words: In various embodiments, the transceiver may be configured to use the determined at least one selected component carrier for the pre-defined communication mode.

In various embodiments, the generated message may be transmitted.

In various embodiments, the generated message may be transmitted using a component carrier that has been previously determined as component carrier which may be used by the radio communication device for the pre-defined communication mode. In other words: In various embodiments, the generated message may be transmitted using a component carrier that has been previously selected as component carrier which may be used by the radio communication device for the pre-defined communication mode.

In various embodiments, the generated message may be transmitted using a physical downlink control channel.

Figure 6:
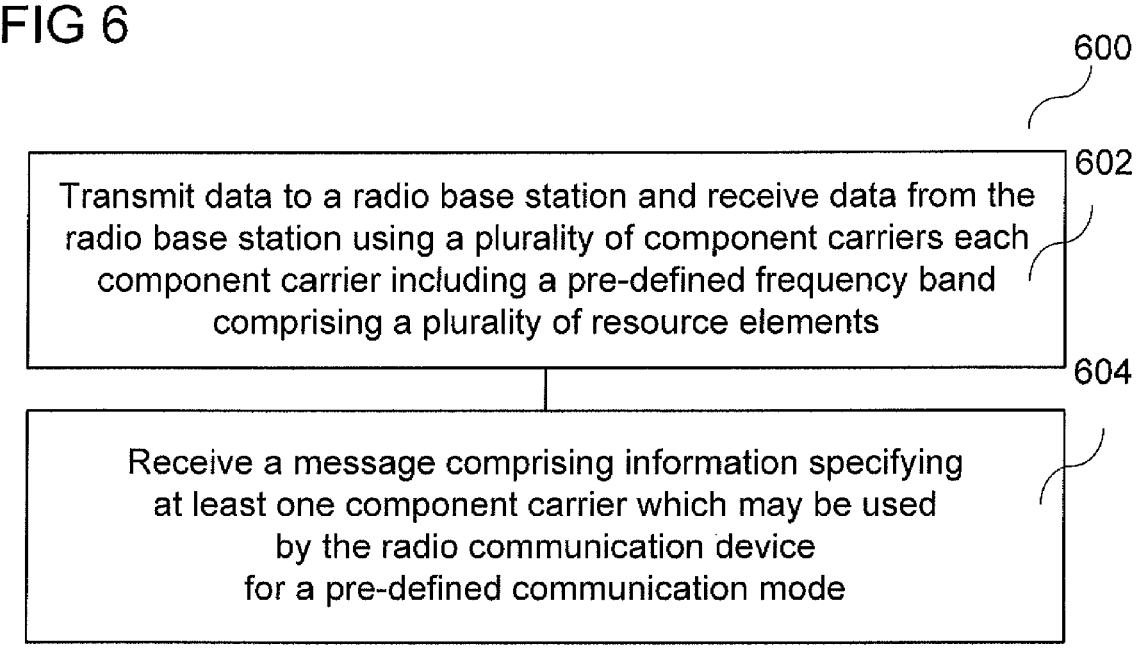
FIG. 6 shows a flow diagram illustrating a method for controlling a radio communication device in accordance with an embodiment.

FIG. 6 shows a flow diagram 600 illustrating a method for controlling a radio communication device in accordance with an embodiment. In 602, data may be transmitted to a radio base station and received from the radio base station using a plurality of component carriers, each component carrier including a pre-defined frequency band including a plurality of resource elements. In other words: In 602, data may be transmitted and received to and from a radio base station using a plurality of component carriers, each component carrier including a pre-defined frequency band including a plurality of resource elements. In 604, a message including information specifying at least one component carrier which may be used by the radio communication device for a pre-defined communication mode may be received.

In various embodiments, data may be transmitted and received according to Third Generation Partnership Project Long Term Evolution Advanced (3GPP LTE Advanced).

In various embodiments, data may be transmitted and received according to Worldwide Interoperability for Microwave Access (WiMax).

In various embodiments, data may be transmitted and received according to an IEEE 802.16 radio communication standard.

In various embodiments, data may be transmitted and received according to WiMax fixed.

In various embodiments, data may be transmitted and received according to WiMax mobile.

In various embodiments, data may be transmitted and received according to an OFDMA (Orthogonal Frequency Division Multiple Access)/TDMA (Time Division Multiple Access) transmission and reception scheme.

In various embodiments, data may be transmitted and received according to a SC-FDMA (Single Carrier Frequency Division Multiple Access)/TDMA (Time Division Multiple Access) transmission and reception scheme.

In various embodiments, data may be transmitted and received according to a multi-carrier transmission scheme.

In various embodiments, the plurality of component carriers may be contiguous.

In various embodiments, the plurality of component carriers may be non-contiguous.

In various embodiments, at least one of the plurality of component carriers may consist of a frequency band with a bandwidth equal to or less than 50 MHz, e.g. of a frequency band with a bandwidth equal to or less than 40 MHz, e.g. of a frequency band with a bandwidth equal to or less than 20 MHz.

In various embodiments, the sum of bandwidths of the bands of the plurality of component carriers may be equal to or less than 500 MHz, e.g. equal to or less than 200 MHz, e.g. equal to or less than 100 MHz.

In various embodiments, the sum of bandwidths of the bands of the plurality of component carriers may be equal to or less than 100 MHz, e.g. equal to or less than 60 MHz, e.g. equal to or less than 40 MHz.

In various embodiments, the resource elements may be resource blocks.

In various embodiments, the pre-defined communication mode may include or may be a communication mode where assignment of resources may go beyond a pre-defined transmission time interval.

In various embodiments, the pre-defined communication mode may include or may be a communication mode of persistently scheduled transmission or reception.

In various embodiments, the pre-defined communication mode may include or may be a communication mode of semi-persistently scheduled transmission or reception.

In various embodiments, the at least one component carrier of the subset may include or may be a component carrier in uplink or downlink to be used by the radio communication device for semi-persistent scheduling. In other words: In various embodiments, the component carrier which may be used by the radio communication device may include or may be a component carrier in uplink or downlink to be used by the radio communication device for semi-persistent scheduling.

In various embodiments, the at least one component carrier of the subset may include or may be an anchor carrier to be used by the radio communication device. In other words: In various embodiments, the component carrier which may be used by the radio communication device may include or may be an anchor carrier to be used by the radio communication device.

In various embodiments, the message may further include information specifying a bandwidth range for dynamic scheduling used to indicate the bandwidth range in uplink or downlink to be used by the radio base station for dynamic scheduling based on the anchor carrier.

In various embodiments, the information specifying the bandwidth range for dynamic scheduling may include at least one of the following information: "symmetrical" for specifying that component carriers located symmetrical around the anchor carrier may be used for dynamic scheduling; "upper" for specifying that component carriers located above the anchor carrier and including the anchor carrier may be used for dynamic scheduling; and "lower" for specifying that component carriers located below the anchor carrier and including the anchor carrier may be used for dynamic scheduling.

In various embodiments, the transceiver may be configured according to the at least one component carrier of the subset. In other words: In various embodiments, the transceiver may be configured according to the determined at least one selected component carrier.

In various embodiments, the transceiver may be configured to use the at least one component carrier of the subset for the pre-defined communication mode. In other words: In various embodiments, the transceiver may be configured to use the determined at least one selected component carrier for the pre-defined communication mode.

In various embodiments, the message may be received using a component carrier that has been previously determined as component carrier which may be used by the radio communication device for the pre-defined communication mode. In other words: In various embodiments, the message may be received using a component carrier that has been previously selected as component carrier which may be used by the radio communication device for the pre-defined communication mode.

In various embodiments, the message may be received using a physical downlink control channel.

Figure 7:
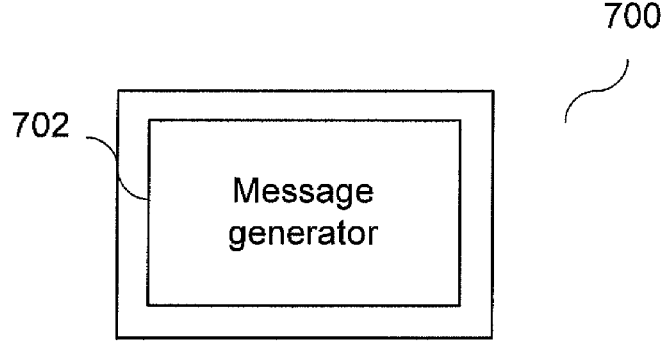
FIG. 7 shows a radio base station in accordance with an embodiment.

FIG. 7 shows a radio base station 700 in accordance with an embodiment. The radio base station 700 may include a message generator configured to generate a message including information specifying at least one selected component carrier of a plurality of component carriers, each component carrier including a pre-defined frequency band including a plurality of resource elements, the at least one selected component carrier being selected as component carriers which may be used by a radio communication device for which the radio base station 700 is providing service for a pre-defined communication mode.

Figure 8:
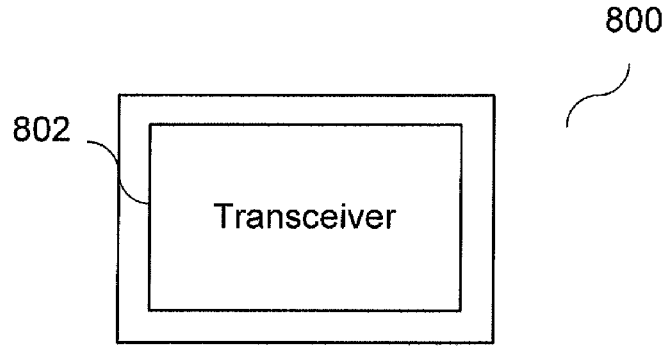
FIG. 8 shows a radio communication device in accordance with an embodiment.

FIG. 8 shows a radio communication device 800 in accordance with an embodiment. The radio communication device 800 may include a transceiver 802 configured to receive a message including information specifying at least one component carrier of a plurality of component carriers, each component carrier including a pre-defined frequency band including a plurality of resource elements which may be used by the radio communication device for a pre-defined communication mode.

In various embodiments, a method for controlling a radio base station may be provided, wherein a message including information specifying at least one selected component carrier of a plurality of component carriers, each component carrier including a pre-defined frequency band including a plurality of resource elements, the at least one selected component carrier being selected as component carriers which may be used by a radio communication device for which the radio base station is providing service for a pre-defined communication mode may be generated.

In various embodiments, a method for controlling a radio communication device is provided, wherein a message including information specifying at least one component carrier of a plurality of component carriers, each component carrier including a pre-defined frequency band including a plurality of resource elements which may be used by the radio communication device for a pre-defined communication mode may be received.

Figure 9:
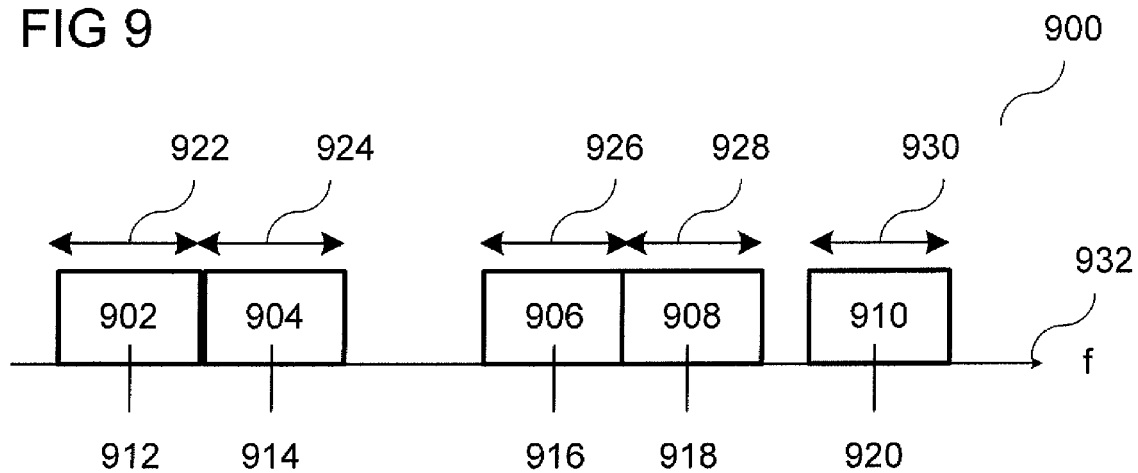
FIG. 9 shows a bandwidth configuration in accordance with an embodiment.

FIG. 9 shows a bandwidth configuration 900 in accordance with an embodiment. For example, the bandwidth configuration 900 may be considered as an exemplary LTE advanced bandwidth configuration.

In various embodiments, bandwidths of more than 20 MHz and up to 100 MHz may be supported by spectrum aggregation. In various embodiments, the system bandwidth may include a number of aggregated component carriers (which may be adjacent or non-adjacent). Further, the size of a component carrier may be limited to 20 MHz. In FIG. 9, an exemplary asymmetric bandwidth configuration, for example an asymmetric LTE-Advanced bandwidth configuration, for FDD (frequency division duplexing) mode is illustrated. For illustration purposes, component carriers are shown over the frequency axis 932. For example, in uplink, overall 40 MHz may be allocated consisting of two adjacent component carriers, a first component carrier 902 and a second component carrier 904, specified by a first carrier frequency 912 and a second carrier frequency 914, respectively. The first component carrier 902 may have a first bandwidth 922 of 20 MHz. The second component carrier 904 may have a second bandwidth 924 of 20 MHz. In DL overall 60 MHz may be allocated consisting of three component carriers, a third component carrier 906, a fourth component carrier 908 and a fifth component carrier 910. Two adjacent component carriers (the third component carrier 906 and the fourth component carrier 908) may be specified by a third carrier frequency 916 and a fourth carrier frequency 918, respectively, and one non-adjacent component carrier (a fifth component carrier 910) may be specified by a fifth carrier frequency 920. The third component carrier 906 may have a third bandwidth 926 of 20 MHz. The fourth component carrier 908 may have a fourth bandwidth 928 of 20 MHz. The fifth component carrier 910 may have a fifth bandwidth 930 of 20 MHz.

In various embodiments, two types of scheduling mechanisms may be supported.

In various embodiments, dynamic scheduling may be applied in uplink and/or downlink, i.e. a radio base station, for example an eNodeB, may dynamically allocate resources (for example physical resource blocks (PRB), and/or a modulation and coding scheme (MCS)) to radio communication devices, for example a user equipment (UE), at each transmission time interval (TTI) via the UE-specific C-RNTI (cell radio network temporary identity) on a control channel, for example on a physical downlink control channel (PDCCH). A UE may always monitor the PDCCH in order to find possible allocations.

In various embodiments, semi-persistent scheduling (SPS) may be applied in uplink and/or downlink if enabled by the radio base station, for example the eNodeB, for example for reducing signaling overhead for periodic type of traffic with predictable packet arrival times and fixed (for example small or medium) payload size such as voice over Internet Protocol (VoIP). In case of SPS, an eNodeB may allocate SPS resources (pre-defined PRBs and MCS) for the first HARQ (hybrid automatic repeat request) transmissions to UEs. SPS allocations may be identified on PDCCH via UE-specific SPS C-RNTI. The SPS resources may be implicitly reused in the following TTIs according to a periodicity defined by the radio base station, for example the eNodeB. Although SPS resources may have been allocated, a radio communication device, for example a UE, may be desired to monitor the PDCCH in the subframes where the UE has been assigned SPS resources, as eNodeB may override the SPS allocation for that TTI.

In various embodiments, limited RF TX/RX (radio frequency transmission/reception) capability of less than 100 MHz of a radio communication device, for example an LTE-Advanced UE, due to technical constraints may be taken into account.

In various embodiments, the Rel-8 (Release 8) LTE principle of RRC (radio resource controller) configuring SPS, and PDCCH activating and deactivating SPS allocations may be applied.

In various embodiments, multiple SPS periods may be configured and they may be allowed to be active simultaneously.

In various embodiments, the SPS allocation may be activated with a single period on only one component carrier.

In accordance with various embodiments, an efficient and fast method may be provided for changing the component carrier for SPS due to radio resource management and/or load balancing between the component carriers.

In accordance with various embodiments, for the case that in addition to SPS also dynamic scheduling may be applied for the radio communication device, for example for an UE, an indication of the bandwidth range for dynamic scheduling to be monitored by the radio communication device, for example an LTE-Advanced UE with limited RF TX/RX capability, may be provided.

According to 3GPP, LTE may be introduced into the Release 8 version of UMTS standards. With LTE the UMTS air interface may be further optimized for packet data transmission by improving the system capacity and the spectral efficiency. Amongst others, the maximum net transmission rate may be increased, for example to 300 Mbps in the downlink transmission direction and to 75 Mbps in the uplink transmission direction. Further, LTE may support scalable bandwidths of [1.4, 3, 5, 10, 15, 20] MHz and may be based on new multiple access methods, for example OFDMA/ TDMA in downlink and SC-FDMA/TDMA in uplink. OFDMA/TDMA, may be referred to as a multicarrier multiple access method in which a subscriber may be provided with a defined number of subcarriers in the frequency spectrum and a defined transmission time for the purpose of data transmission. The RF (radio frequency) capability of an LTE UE for transmission and reception may be set to 20 MHz. A physical resource block (PRB) may be the baseline unit of allocation for the physical channels defined in LTE. A physical resource block may include a matrix of 12 subcarriers by 6 or 7 OFDMA/SC-FDMA symbols. A pair of one OFDMA/ SC-FDMA symbol and one subcarrier may be denoted as resource element.

Figure 10:
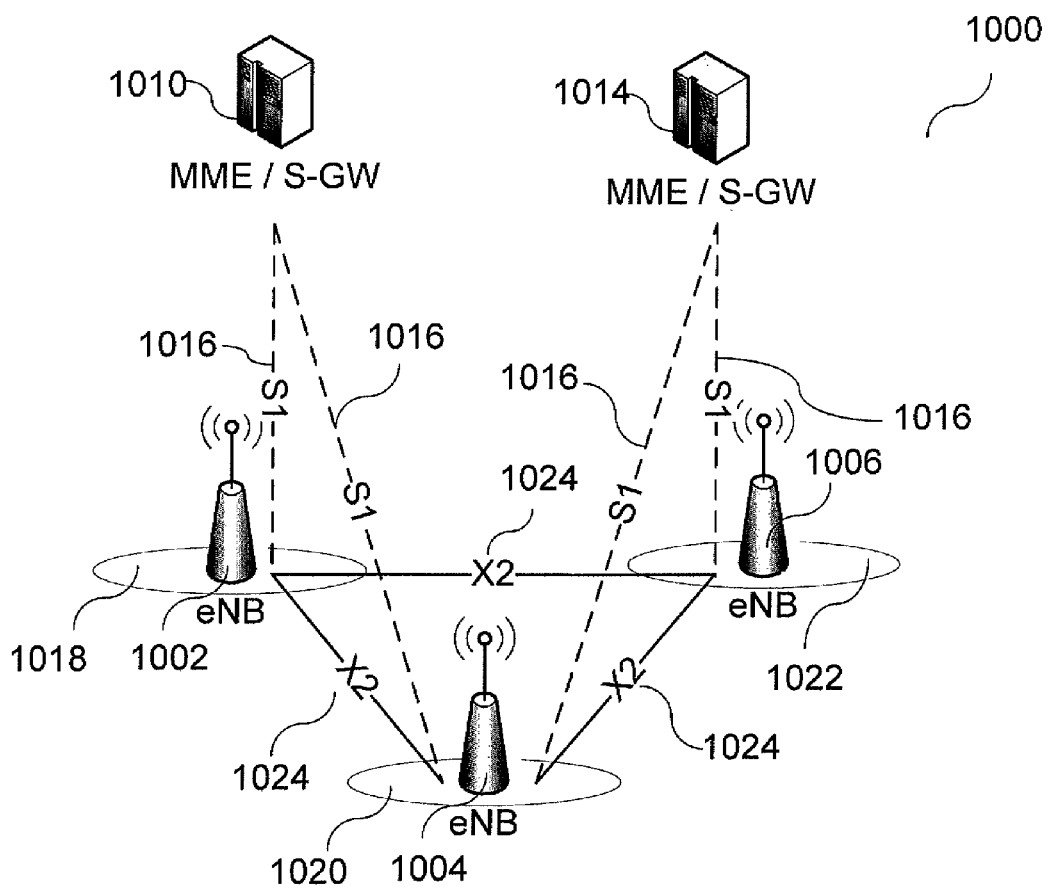
FIG. 10 shows an E-UTRAN (Evolved UMTS (Universal Mobile Telecommunications System) Terrestrial Radio Access Network) architecture in accordance with an embodiment.

FIG. 10 shows an example E-UTRAN architecture 1000 including three eNodeBs 1002, 1004, 1006, two Evolved Packet Cores (EPCs), e.g. a first EPC (not shown), provided by a first operator A (not shown) and including a first MME/ S-GW 1010, and a second EPC (not shown), provided by a second operator B (not shown) and including a second MME/ S-GW 1014. In LTE, e.g. according to the LTE network architecture, as shown in the Logical E-UTRAN Architecture as defined by 3GPP shown in FIG. 10, the eNodeBs 1002, 1004, 1006, may be interconnected with each other by means of the X2 interfaces 1024. Furthermore, eNodeBs 1002, 1004, 1006, may be connected by means of the Si interfaces 1016 to the MME/S-GW 1010, 1014, of the respective first EPC and second EPC. The Si interface 1016 as defined by 3GPP may support a many-to-many relation between the first and second EPC, and eNodeB 1002, 1004, 1006, i.e. theoretically different operators may simultaneously operate the same eNodeB 1002, 1004, 1006. The eNodeBs 1002, 1004, 1006 may provide mobile radio coverage for the radio communication terminal device located in the respective mobile radio cells 1018, 1020, 1022.

The high-level network architecture of LTE may include the radio access network E-UTRAN (Evolved UMTS Terrestrial Radio Access Network) and the core network EPC (Evolved Packet Core). The E-UTRAN may include base transceiver stations eNodeB (eNBs) 1002, 1004, 1006. Each eNB 1002, 1004, 1006 may provide radio coverage for one or more mobile radio cells within E-UTRAN. Control and user data may be transmitted between a respective eNB 1002, 1004, 1006 and a UE in a mobile radio cell over the air interface on the basis of a multiple access method. The eNBs may be interconnected with each other by means of the X2 interface. The eNBs 1002, 1004, 1006 may also be connected by means of the Si interface to the EPC (Evolved Packet Core), more specifically to the MME (Mobility Management Entity) 1010, 1014, and to the Serving Gateway (S-GW) 1010, 1014. The MME 1010, 1014 may be responsible for controlling the mobility of UEs located in the coverage area of E-UTRAN, while the S-GW 1010, 1014 may be responsible for handling the transmission of user data between UE and network.

In LTE the following types of duplexing methods may be supported: full-duplex FDD (frequency division duplexing), half-duplex FDD and TDD (time division duplexing). Full-duplex FDD may use two separate frequency bands for uplink and downlink transmissions, and both transmissions may occur simultaneously. Half-duplex FDD may also use two separate frequency bands for uplink and downlink transmissions, but both transmissions may be non-overlapping in time. TDD may use the same frequency band for transmission in both uplink and downlink. Within a time frame the direction of transmission may be switched alternatively between downlink and uplink.

FIG. 11 shows a frame structure 1100 in accordance with an embodiment. The frame structure type 1 as shown in FIG. 11 may be applicable to both full-duplex and half-duplex FDD. Each radio frame 1102 may be 10 ms long (this length may for example be denoted $T_f$ and may be the length of 307 200 basic lengths $T_S$) and may consist of 20 slots 1104 of length 0.5 ms (this length may for example be denoted $T_{slot}$ and may be the length of 15360 basic lengths $T_S$), numbered from #0 to #19. A subframe 1106 may be defined as two consecutive slots. In each 10 ms interval 10 subframes may be available for downlink transmissions and 10 subframes may be available for uplink transmissions. Uplink and downlink transmissions may be separated in the frequency domain. Depending on the slot format, a subframe may consist of 14 or 12 OFDMA symbols in DL and 14 or 12 SC-FDMA symbols in UL respectively. Further, due to the TDMA component of the LTE multiple access schemes in UL and DL so-called timing advance (TA) adjustments for the uplink transmissions may take place with the aim that a signal from a UE may arrive at the base transceiver station according to the determined frame/subframe timing and does not interfere with the transmission of others UEs. A timing advance value may correspond to the length of time a UE has to advance its timing of UL transmission and may be sent by the eNodeB to UE according to the perceived propagation delay of UL transmissions.

In various embodiments, in UL/DL and FDD mode, amongst others the following physical channels may be specified:

PUSCH (Physical Uplink Shared Channel): may carry user and control data in uplink;

PUCCH (Physical Uplink Control Channel): may be an uplink physical channel only, i.e. no logical and transport channels may be mapped to this channel; may carry the control information such as HARQ ACK (acknowledgment)/ NACKs (negative acknowledgments) in response to downlink transmissions on PDSCH (Physical Downlink Shared Channel), scheduling requests and CQI (channel quality indicator) reports;

PDSCH (Physical Downlink Shared Channel): may carry user and control data and paging messages in downlink; may occupy the OFDMA symbols in a subframe not occupied by PDCCH (Physical Downlink Control Channel);

PDCCH (Physical Downlink Control Channel): may be a downlink physical channel only, i.e. no logical and transport channels may be mapped to this channel; may carry the control information related to DL/UL transmissions such as resource assignments and HARQ information; may occupy 1, 2, 3 or 4 OFDMA symbols in the first slot in a subframe, wherein the number of symbols may be adjusted by network and signaled on PCFICH (Physical Control Format Indicator Channel);

PCFICH (Physical Control Format Indicator Channel): may be a downlink physical channel; may inform the UE about the number of OFDMA symbols used for the PDCCHs; may occupy the first OFDMA symbol in the first slot in a subframe; may be transmitted when the number of OFDMA symbols for PDCCH is greater than zero;

PHICH (Physical Hybrid ARQ (Automatic Repeat Request) Indicator Channel): may be a downlink physical channel; may carry Hybrid ARQ ACK/NACKs in response to uplink transmissions; may occupy 1, 2, or 3 OFDMA symbols in the first slot in a subframe, wherein the number of symbols may be adjusted by network and signaled on P-BCH (Primary Broadcast Channel); and P-BCH (Primary Broadcast Channel): may carry system information to be broadcast in the cell such as DL bandwidth information and number of OFDMA symbols assigned to PHICH.

FIG. 12 shows a diagram 1200 illustrating an uplink/downlink transmission timing for frequency division duplex in accordance with an embodiment. Transmission from a radio base station 1202 to a radio communication device 1204 may be performed in (downlink) subframes, for example in a number of consecutive (downlink) subframes, for example (downlink) subframe #i (1206), (downlink) subframe #i+1 (1208), (downlink) subframe #i+2 (1210), (downlink) subframe #i+3 (1212), (downlink) subframe #i+4 (1214), (downlink) subframe #i+5 (1216), and so on. Transmission from a radio communication device 1204 to a radio base station 1202 may be performed in (uplink) subframes, for example in a number of consecutive (uplink) subframes, for example (uplink) subframe #i (1218), (uplink) subframe #i+1 (1220), (uplink) subframe #i+2 (1222), (uplink) subframe #i+3 (1224), (uplink) subframe #i+4 (1226), (uplink) subframe #i+5 (1228), and so on.

The following UL-DL transmission timing relationship may be apply for FDD as illustrated in FIG. 12:

The radio communication device 1204, for example a UE, may, upon detection of a PDSCH transmission 1232 in subframe #i (1206) intended for the UE (indicated by preceding PDCCH 1230) and for which an HARQ ACK/NACK shall be provided, transmit the ACK/NACK response in subframe #i+4 (1226), e.g. on PUCCH 1236.

The UE 1204 may, upon detection of a PDCCH 1234 with DCI (Downlink Control Information) format 0 (=UL grant) in subframe #i+1 (1208) intended for the UE 1204, adjust the corresponding PUSCH transmission 1238 in subframe #i+5 (1228) according to the PDCCH information 1234.

In accordance with an embodiment, in FDD a Hybrid Automatic Repeat Request (HARQ) mechanism, i.e. combination of channel coding and 8-channel Stop & Wait ARQ mechanism, may be applied in UL and DL as a method for backward error correction, in which a subchannel may correspond to a single transmission of length 1 ms (=1 subframe). The operation of HARQ in a subchannel may be referred to as HARQ process. With HARQ each transmission of data (control or user data in UL and DL) in a transport block in a subframe may be positively (ACK) or negatively acknowledged (NACK) by the receiver by sending the information whether a transport block has been successfully received or not. If successfully received, the sender may be expected to send a new data block in the next related subframe. If not successfully received the sender may be expected to re-transmit the data block in the next related subframe. In case of retransmission the receiver may store the erroneously received data block. This stored data block may then be soft combined with the retransmitted data block and jointly decoded. With each HARQ retransmission the code rate may be decreased on one hand, but on the other hand the error correction capability may be increased as with every retransmission additional redundancy information may be received for channel decoding. For data blocks transmitted in DL by the eNodeB a fixed relationship in time between data transmission and acknowledgements may exist. After a DL transmission in subframe #i, the UE may be expected to acknowledge the DL data reception in the subframe #i+4. The same timing relationship may exist in UL, i.e. after an UL transmission in subframe #i the eNodeB may be expected to acknowledge the UL data reception in subframe #i+4.

According to 3GPP, LTE may be advanced towards an IMT-Advanced (IMT: International Mobile Telecommunications) radio interface technology, which may be referred to as LTE-Advanced. In line with user trends and technology developments the key objective of the IMT-Advanced activities may be to develop mobile radio communication systems that include new capabilities that go beyond those of current IMT-2000 systems such as UMTS (Universal Mobile Telecommunications System) or CDMA2000 (CDMA: Code division multiple access). Features to be supported by IMT-Advanced systems, for example according to ITU-R (International Telecommunication Union (ITU) Radiocommunication Sector) may include:

high quality mobile services;
worldwide roaming capability; and
peak data rates of 100 Mbps (megabit per second) for high mobility environments and 1 Gbps (gigabit per second) for low mobility environments.

According to 3GPP, LTE-Advanced may include technologies to further evolve LTE in terms of spectral efficiency, cell edge throughput, coverage and latency. Candidate technologies may include multi-hop Relay, UL MIMO (multiple input, multiple output), for example with up to (4×4) antennas, DL MIMO, for example with up to (8×8) antennas, Coordinated Multipoint Transmission/Reception (CoMP), support of bandwidths higher than 20 MHz and up to 100 MHz by spectrum aggregation, flexible spectrum usage and/or spectrum sharing, and intercell interference management.

Furthermore, an LTE-Advanced network may be backward compatible with LTE, i.e. an LTE-Advanced eNodeB may also support LTE UEs which are located in the cell.

Figure 13:
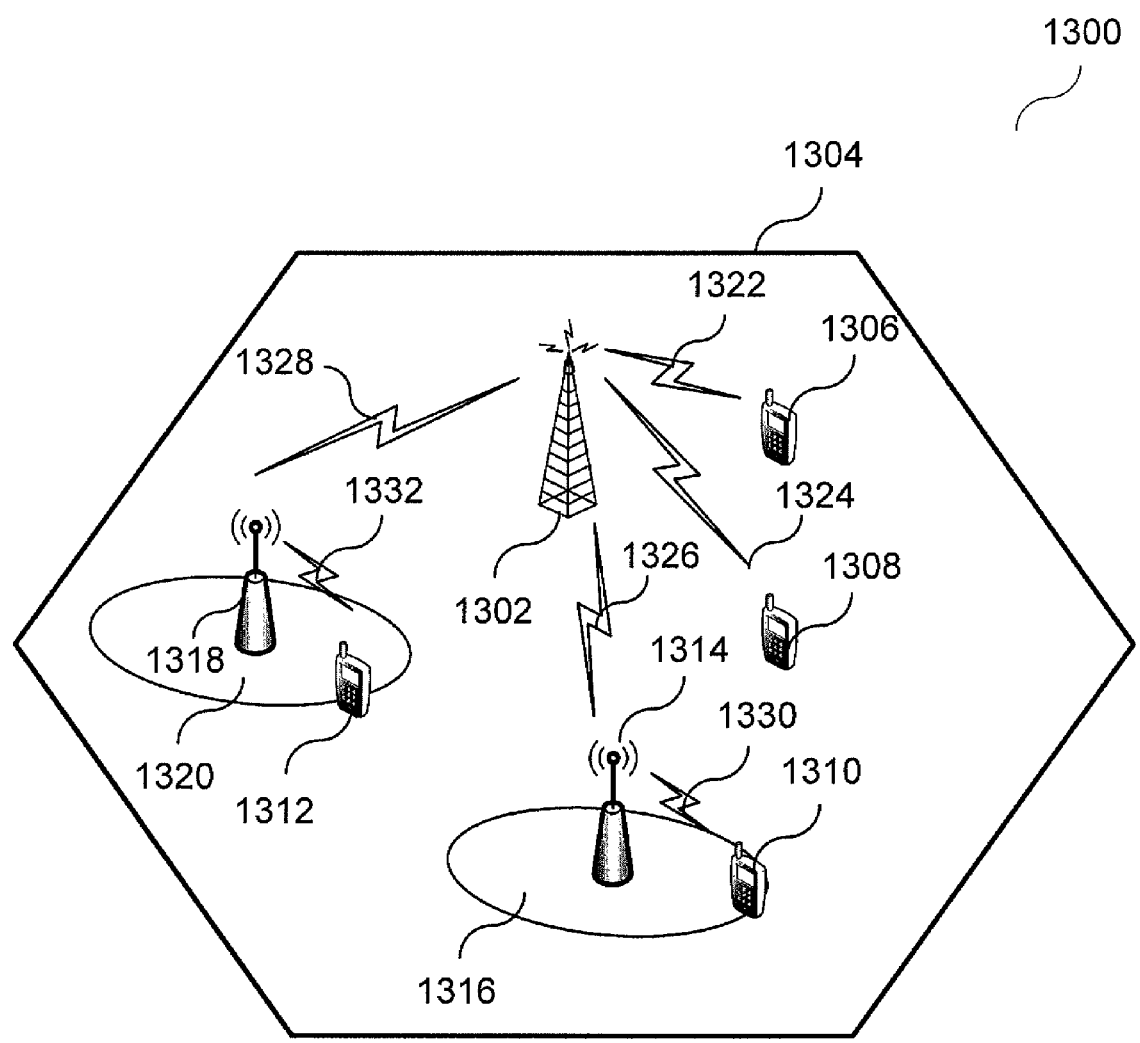
FIG. 13 shows a deployment scenario of LTE-Advanced (Long Term Evolution Advanced) in accordance with an embodiment.

FIG. 13 shows a deployment scenario 1300 of LTE-advanced in accordance with an embodiment. As shown in FIG. 13, coverage 1304 of a cell may be provided by an LTE-Advanced eNodeB 1302. The eNodeB 1302 may support direct connections to/from LTE-A UEs (LTE-advanced UEs) and LTE UEs as well. For example, the eNodeB 1302 may support direct connection to a first LTE UE 1306, as indicated by arrow 1322. For example, the eNodeB 1302 may support direct connection to a first LTE-A UE 1308, as indicated by arrow 1324. Relay nodes, referred to as NodeRs, may be deployed in the cell for providing additional coverage at cell-edge or coverage holes to all UEs (LTE-A and LTE UEs) located in these areas. UEs may communicate with the eNodeB in uplink and downlink through the intermediate NodeRs. For example, a first NodeR 1314 may provide a first additional coverage 1316. A second LTE-A UE 1310 may communicate via the first NodeR 1314 (as indicated by arrow 1330) with the eNodeB 1302 (as indicated by arrow 1326). For example, a second NodeR 1318 may provide a second additional coverage 1320. A second LTE UE 1312 may communicate via the second NodeR 1318 (as indicated by arrow 1332) with the eNodeB 1302 (as indicated by arrow 1328).

In various embodiments, semi-persistent scheduling (SPS) may be applied in UL/DL in addition to dynamic scheduling if enabled by eNodeB for reducing signaling overhead for periodic type of traffic with predictable packet arrival times and fixed (for example small or medium) payload size such as VoIP.

In various embodiments, SPS may be enabled by eNodeB over an RRC message signaling amongst other at least one of the following parameters:

semiPersistSchedC-RNTI: UE-specific SPS-CRNTI (CRNTI: Cell Radio Network Temporary Identity) used to identify SPS resource allocations in UL/DL on PDCCH;

semiPersistSchedIntervalDL: Periodicity of allocated SPS resources in DL given in terms of number of subframes; and semiPersistSchedIntervalUL: Periodicity of allocated SPS resources in UL given in terms of number of subframes.

In various embodiments, an eNodeB may allocate to a UE SPS resources (for example pre-defined PRBs and MCS) for the first HARQ transmissions on PUSCH and PDSCH, respectively.

In various embodiments, the pre-defined SPS resources to be used and the starting time of SPS may be signaled by the eNodeB to the UE through PDCCH.

In various embodiments, SPS allocations may be identified on PDCCH via UE-specific SPS C-RNTI.

In various embodiments, the SPS resources may be implicitly reused in the following TTIs according to a periodicity defined by eNodeB.

In various embodiments, for N>0, the UE may determine the SPS schedule in DL as follows:

$$(10*SFN+subframe)=[(10*SFN_{start\ time}+ subframe_{start\ time})+ N*semiPersistSchedIntervalDL] \mod 10240,$$

and for N>0 the UE may determine the SPS schedule in UL as follows:

$$(10*SFN+subframe)=[(10*SFN_{start\ time}+ subframe_{start\ time})+ N*semiPersistSchedIntervalUL] \mod 10240,$$

wherein SFN may denote the System Frame Number and $SFN_{start\ time}$ and $subframe_{start\ time}$ are the SFN and subframe, respectively, at the time the configured SPS resources were initialized in UL/DL.

In various embodiments, although SPS resources have been allocated, UE may be desired to monitor the PDCCH in the subframes where the UE has been assigned SPS resources as eNodeB may override the SPS allocation for that TTI.

In various embodiments, explicit activation and/or deactivation of SPS resources in UL/DL may be performed by transmitting PDCCH containing specific content. Further, specifically for UL an implicit deactivation of UL SPS resources may be defined by transmitting N consecutive PUSCH with zero payload size.

FIG. 14 shows a flow diagram 1400 illustrating initial semi-persistent scheduling activation in downlink in accordance with an embodiment. In an embodiment, PDSCH may be used for downlink transmission. In 1406, a radio base station 1402 may send initial SPS activation using PDCCH to a radio communication device 1404. Thereafter, data may be sent from the base station 1402 using PDSCH in 1408. As indicated by arrow 1410, upon detection of the data sent on PDSCH in 1408 the radio communication device 1404 may send ACK resp. NACK in subframe 1412, which may be a number of subframes after the data has been sent, for example three subframes 1422. Then, in a periodicity of a pre-defined number of subframes 1420, the radio base station 1402 may send data in 1414. Again, after the pre-defined number of subframes 1420, the radio base station 1402 may send data in 1416 and so on. Each subframe, one representative of which is denoted by 1418, may for example have a length of 1 ms.

FIG. 15 shows a flow diagram 1500 illustrating initial semi-persistent scheduling activation in uplink in accordance with an embodiment. In an embodiment, PUSCH may be used for uplink transmission. In 1506, a radio base station 1502 may send initial SPS activation using PDCCH to a radio communication device 1504. As indicated by arrow 1510, upon detection of the activation data on PDCCH the radio communication device 1504 may send data in subframe 1514, which may be a number of subframes after the PDCCH has been sent, for example three subframes 1512. Then, in a periodicity of a pre-defined number of subframes 1516, the radio communication device 1504 may send data in 1518 and so on. One subframe 1508 may for example have a length of 1 ms.

In various embodiments, methods and devices for applying SPS in LTE-Advanced may be provided.

In various embodiments, the Rel-8 LTE principle of RRC configuring SPS, and PDCCH activating and deactivating SPS allocations dynamically may be applied.

In various embodiments, the SPS configuration signaled to UE via RRC message may apply to all component carriers configured for SPS for that UE.

In various embodiments, at any time, SPS may be performed on one component carrier only. In various embodiments, the amount of traffic may require only few physical resource blocks.

In various embodiments, depending on the RF TX/RX capability of the UE, one or more of the following parameters may be signaled by a radio base station, for example an eNodeB, over an RRC message:
component carriers in UL/DL used by the radio base station, for example eNodeB, for SPS;
initial SPS anchor carrier used to indicate the component carrier in DL on which SPS can be initially activated by eNodeB via PDCCH; in another embodiment, the initial SPS anchor carrier may be determined implicitly based on signaled SPS C-RNTI, for example according to following formula:

$$(SPS\ C\text{-}RNTI)\ modulo\ (number\ of\ component\ carriers\ in\ DL\ used\ for\ SPS)=0;$$

bandwidth range for dynamic scheduling used to indicate the bandwidth range in UL/DL used by the radio base station, for example the eNodeB, for dynamic scheduling based on the SPS anchor carrier. In various embodiments, the value range for DL may include: "symmetrical", "upper", or "lower", wherein: "symmetrical" may indicate that component carriers located symmetrical around SPS anchor carrier may be used; "upper" may indicate that component carriers located above SPS anchor carrier and including SPS anchor carrier may be used; and "lower" may indicate that component carriers located below SPS anchor carrier and including SPS anchor carrier may be used. In various embodiments, the value range for UL may include carrier frequencies used in UL.

In various embodiments, a new physical PDCCH order for signaling SPS anchor carrier change may be provided.

In various embodiments, the order for signaling SPS anchor carrier change may be incorporated in commonly used PDCCHs used for activating/deactivating SPS resources.

In accordance with various embodiments, an efficient and fast method in terms of signaling latency and signaling overhead may be provided for changing the component carrier for SPS due to radio resource management and/or load balancing between the component carriers.

In accordance with various embodiments, an indication of the bandwidth range for dynamic scheduling to be monitored by the UE for the case that in addition to SPS also dynamic scheduling shall be applied for the UE may be provided.

In various embodiments, one or more of the following SPS-related parameters may be signaled by a radio base station, for example an eNodeB, for example over an RRC message:
component carriers in UL/DL used by the radio base station, for example the eNodeB, for SPS;

initial SPS anchor carrier used to indicate the component carrier in DL on which SPS can be initially activated by the radio base station, for example an eNodeB, for example via PDCCH; and bandwidth range for dynamic scheduling used to indicate the bandwidth range in UL/DL used by the radio base station, for example the eNodeB, for dynamic scheduling based on the SPS anchor carrier.

In various embodiments, a new physical PDCCH order for signaling SPS anchor carrier change may be provided.

Figure 16:
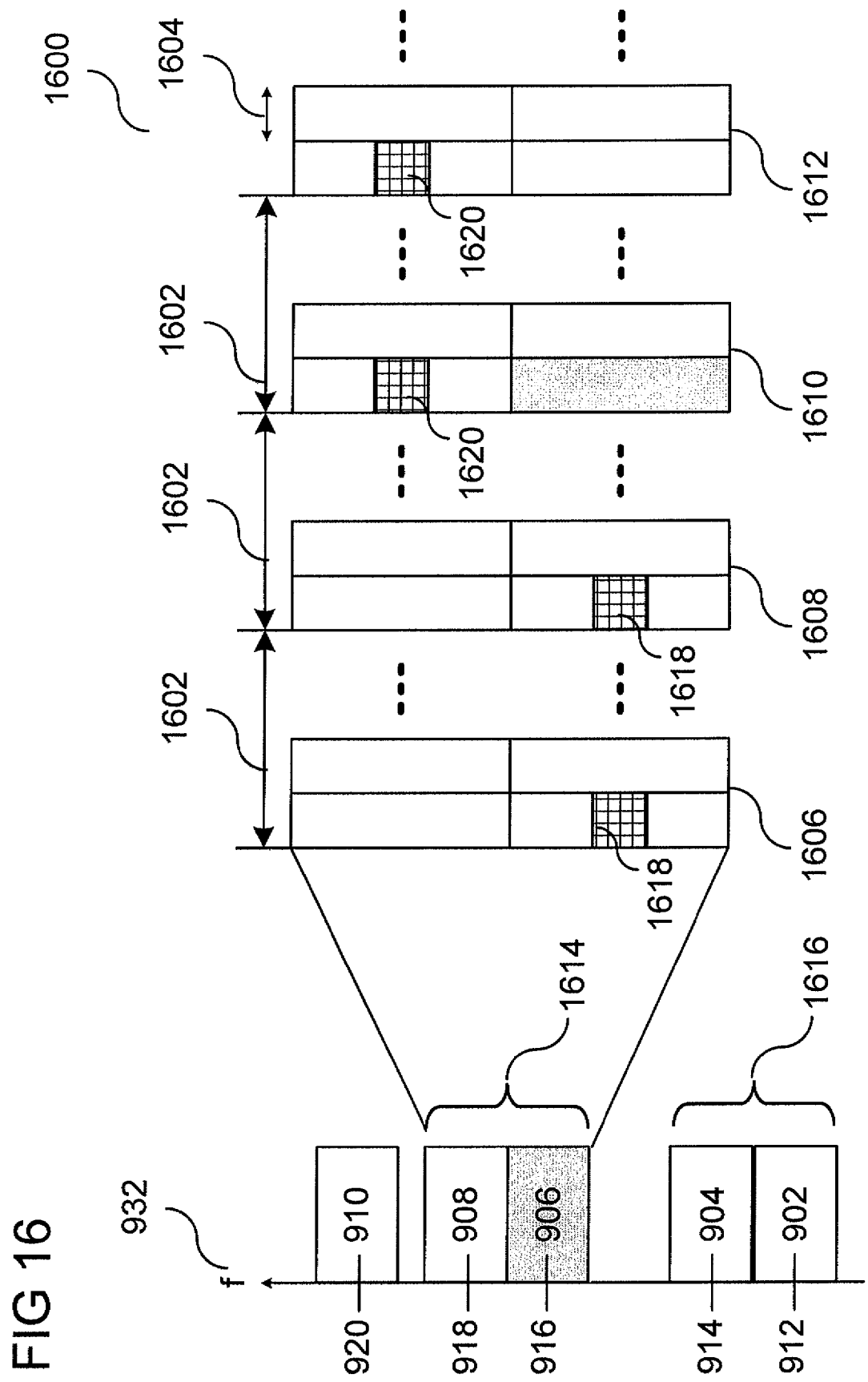
FIG. 16 shows a semi-persistent scheduling configuration in accordance with an embodiment.

FIG. 16 shows a semi-persistent scheduling configuration 1600 in accordance with an embodiment.

In accordance with various embodiments, an LTE-Advanced network based on OFDMA/TDMA in downlink, SC-FDMA/TDMA in uplink, and operating in FDD mode may be used in the configuration 1600.

An LTE-Advanced radio cell operating according to the asymmetric bandwidth configuration as depicted in FIG. 9 may be used in the configuration 1600. In UL overall 40 MHz may be allocated consisting of the two adjacent component carriers 902 and 904 specified by the carrier frequencies 912 and 914, respectively. In DL overall 60 MHz may be allocated consisting of the three component carriers 906, 908, and 910: the two adjacent component carriers 906 and 908 may be specified by the carrier frequencies 916 and 918, respectively, and the non-adjacent component carrier 910 may be specified by the carrier frequency 920.

For example, the configuration 1600 may be present in the deployment scenario according to FIG. 13, wherein coverage of the cell may be provided by an LTE-Advanced eNodeB. The eNodeB may support direct connections to/from radio communication devices, for example a first LTE UE and a first LTE-A UE. Further, connections to/from further radio communication devices, for example a second LTE UE and a second LTE-A UE, may be supported through intermediate NodeRs, for example a first NodeR and a second NodeR.

For example, a radio communication device, for example the first LTE-A UE, may have a RF TX/RX capability of 40 MHz, and may currently be in a multi-call session for web-browsing and streaming. For example, the radio communication device, for example the first LTE-A UE, may be requesting to eNodeB a further VoIP call.

In addition to dynamic scheduling for the existing services (web-browsing and streaming) the radio base station, for example the eNodeB, may decide to configure SPS in UL/DL for the radio communication device, for example the first LTE-A UE, for reducing signaling overhead for the requested VoIP call. The radio base station may send to the radio communication device, for example the first LTE-A UE, a RRC connection reconfiguration message for enabling SPS and providing for example one or more of the following parameters:

radio communication device specific, for example UE-specific, SPS-CRNTI used to identify SPS resource allocations in UL/DL on PDCCH;

periodicity of allocated SPS resources in UL/DL given in terms of number of subframes;

component carriers in UL/DL used for SPS; in the configuration 1600 for example the third component carrier 906 and the fourth component carrier 908 specified by the third carrier frequency 916 and the fourth carrier frequency 918, respectively, for the downlink, and the first component carrier 902 and the second component carrier 904 specified by the first carrier frequency 912 and the second carrier frequency 914, respectively, for the uplink.

initial SPS anchor carrier; in the configuration 1600 for example the third component carrier 906 specified by the third carrier frequency 916;

bandwidth range for dynamic scheduling; in the configuration 1600 for example for downlink, the parameter "upper" may be signaled, which for example may define the third component carrier 906 and the fourth component carrier 908 (which may include the anchor carrier and the carrier above the anchor carrier as desired by the parameter "upper") specified by the carrier third frequency 916 and the fourth carrier frequency 918, respectively, for the downlink as indicated by bracket 1614, and the first component carrier 902 and the second component carrier 904 specified by first carrier frequency 912 and the second carrier frequency 914, respectively, may be used for the uplink as indicated by bracket 1616.

In various embodiments, the radio communication device, for example the first LTE-A UE may, according to the signaled parameters, determine the SPS schedule in UL and DL. In FIG. 16, an example of the DL SPS operation for a radio communication device, for example the first LTE-A UE, in accordance with various embodiments is depicted. In the first transmission time interval 1606, the radio base station, for example the eNodeB, may initially activate the DL SPS operation by transmitting the corresponding PDCCH to the radio communication device. The PDCCH may include the allocated SPS resources 1618 (for example 4 PRBs) for PDSCH intended for the radio communication device. These SPS resources 1618 may be implicitly reused in the following TTIs, for example the second TTI 1608, the third TTI 1610, the fourth TTI 1612, and so on, according to the DL periodicity defined by the radio base station, for example the periodicity 1602 in subframes. One exemplary subframe is denoted by 1604. As an example, in the third TTI 1610, the radio base station may send, for example for load balancing reason, the new PDCCH order for signaling a command for SPS anchor carrier change to the fourth component carrier 908 specified by the fourth carrier frequency 918, because for example the resources in current anchor carrier may be over-utilized so that QoS for the VoIP call may not be guaranteed. As result, the radio communication device may find its allocated SPS resources 1620 in the following TTIs (the third TTI 1610, the fourth TTI 1612, and so on) in the new anchor carrier 908 specified by the fourth carrier frequency 918.

With regard to the existing services (for example web-browsing and streaming) for which dynamic scheduling is applied, the radio communication device may monitor the PDCCH in the DL component carriers (for example the third component carrier 906 and the fourth component carrier 908) specified by the third carrier frequency 916 and the fourth carrier frequency 918, respectively, and UL component carriers (for example the first component carrier 902 and the second component carrier 904) specified by the first carrier frequencies 912 and the second carrier frequency 914.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio base station comprising:
a transceiver configured to transmit data to a radio communication device and receive data from the radio communication device using a plurality of component carriers simultaneously using spectrum aggregation, each component carrier comprising a pre-defined frequency band comprising a plurality of resource elements;

a component carrier determiner configured to:
  determine a subset comprising at least one component carrier of the plurality of component carriers, wherein the at least one component carrier of the subset is used by the radio communication device for a pre-defined communication mode; and
  identify an anchor carrier of the at least one component carrier of the subset to be used for the pre-defined communication mode; and a message generator configured to generate a message comprising information specifying that the at least one component carrier of the subset is used by the radio communication device for the pre-defined communication mode and specifying the anchor carrier of the at least one component carrier of the subset to be used for the pre-defined communication mode, and wherein the message further comprises information specifying a bandwidth range for dynamic scheduling used to indicate the bandwidth range in at least one of uplink and downlink to be used by the radio base station for dynamic scheduling based on the anchor carrier.

2. The radio base station of claim 1,
wherein the component carrier determiner is configured to receive information from the core network, the received information specifying that the at least one component carrier of the subset may be used by the radio communication device for the pre-defined communication mode.

3. The radio base station of claim 1,
wherein the pre-defined communication mode comprises a communication mode where assignment of resources may go beyond a pre-defined transmission time interval.

4. The radio base station of claim 3,
wherein the pre-defined communication mode comprises a communication mode of at least one of persistently scheduled transmission and persistently scheduled reception.

5. The radio base station of claim 3,
wherein the pre-defined communication mode comprises a communication mode of at least one of semi-persistently scheduled transmission and semi-persistently scheduled reception.

6. The radio base station of claim 1,
wherein the at least one component carrier of the subset comprises a component carrier in at least one of uplink and downlink to be used by the radio communication device for semi-persistent scheduling.

7. The radio base station of claim 1, further comprising:
a transceiver configurator configured to configure the transceiver according to the at least one component carrier of the subset.

8. The radio base station of claim 7,
wherein the transceiver configurator is further configured to configure the transceiver to use the at least one component carrier of the subset for the pre-defined communication mode.

9. The radio base station of claim 1,
wherein the transceiver is further configured to transmit the generated message using a component carrier that has been previously determined as component carrier which may be used by the radio communication device for the pre-defined communication mode.

10. The radio base station of claim 1,
wherein the transceiver is further configured to transmit the generated message using a physical downlink control channel.

11. A radio communication device comprising:
a transceiver configured to transmit data to a radio base station and receive data from the radio base station using a plurality of component carriers simultaneously using spectrum aggregation, each component carrier comprising a pre-defined frequency band comprising a plurality of resource elements;
wherein the transceiver is further configured to receive a message comprising information specifying at least one component carrier which is used by the radio communication device for a pre-defined communication mode and specifying an anchor carrier of the at least one component carrier of the subset to be used for the pre-defined communication mode, and wherein the message further comprises information specifying a bandwidth range for dynamic scheduling used to indicate the bandwidth range in at least one of uplink and downlink to be used by the radio base station for dynamic scheduling based on the anchor carrier.

12. The radio communication device of claim 11,
wherein the pre-defined communication mode comprises a communication mode where assignment of resources may go beyond a pre-defined transmission time interval.

13. The radio communication device of claim 12,
wherein the pre-defined communication mode comprises a communication mode of at least one of semi-persistently scheduled transmission and semi-persistently scheduled reception.

14. The radio communication device of claim 11,
wherein the component carrier which may be used by the radio communication device comprises a component carrier in at least one of uplink and downlink to be used by the radio communication device for semi-persistent scheduling.

15. The radio communication device of claim 11, further comprising:
a transceiver configurator configured to configure the transceiver according to the at least one selected component carrier of the subset.

16. The radio communication device of claim 15,
wherein the transceiver configurator is further configured to configure the transceiver to use the at least one selected component carrier of the subset for the pre-defined communication mode.

17. The radio communication device of claim 11,
wherein the transceiver is further configured to receive the message using a component carrier that has been specified as component carrier which may be used by the radio communication device for the pre-defined communication mode in a previously received message.

18. The radio communication device of claim 11,
wherein the transceiver is further configured to receive the message using a physical downlink control channel.

19. A method for controlling a radio base station, the method comprising:
transmitting data to a radio communication device and receiving data from the radio communication device using a plurality of component carriers simultaneously using spectrum aggregation, each component carrier comprising a pre-defined frequency band comprising a plurality of resource elements;
determining a subset comprising at least one component carrier of the plurality of component carriers, wherein the at least one component carrier of the subset is used by the radio communication device for a pre-defined communication mode;

identifying an anchor carrier of the at least one component carrier of the subset to be used for the pre-defined communication mode and generating a message comprising information specifying that the at least one component carrier of the subset is used by the radio communication device for the pre-defined communication mode and specifying the anchor carrier of the at least one component carrier of the subset to be used for the pre-defined communication mode, and wherein the message further comprises information specifying a bandwidth range for dynamic scheduling used to indicate the bandwidth range in at least one of uplink and downlink to be used by the radio base station for dynamic scheduling based on the anchor carrier.

20. A method for controlling a radio communication device, the method comprising:

transmitting data to a radio base station and receiving data from the radio base station using a plurality of component carriers simultaneously using spectrum aggregation, each component carrier comprising a pre-defined frequency band comprising a plurality of resource elements;

receiving a message comprising information specifying at least one component carrier which is used by the radio communication device for a pre-defined communication mode and specifying an anchor carrier of the at least one component carrier of the subset to be used for the pre-defined communication mode, and wherein the message further comprises information specifying a bandwidth range for dynamic scheduling used to indicate the bandwidth range in at least one of uplink and downlink to be used by the radio base station for dynamic scheduling based on the anchor carrier.

21. A radio base station comprising:

a message generator configured to generate a message comprising information specifying at least one selected component carrier of a plurality of component carriers and specifying an anchor carrier of the at least one component carrier of the plurality of component carriers to be used for a pre-defined communication mode, and wherein the message further comprises information specifying a bandwidth range for dynamic scheduling used to indicate the bandwidth range in at least one of uplink and downlink to be used by the radio base station for dynamic scheduling based on the anchor carrier; each component carrier comprising a pre-defined frequency band comprising a plurality of resource elements, the at least one selected component carrier being selected as component carrier which is used by a radio communication device for which the radio base station is providing service for the pre-defined communication mode.

* * * * *